United States Patent Office 2,776,219
Patented Jan. 1, 1957

2,776,219
GELATIN COATING SOLUTION FOR FILM SUPPORT

Fred W. Hoyt and David L. Kendall, Rochester, N. Y., assignors to Eastman Kodak Company, Rochester, N. Y., a corporation of New Jersey No Drawing. Application September 2, 1954, Serial No. 453,940

4 Claims. (Cl. 106—128)

This invention relates to the dispersion of gelatin in solutions of the type employed to coat photographic film support, and more particularly to the provision of a colloidal dispersion of gelatin in which the gelatin will remain in solution for relatively long periods as compared with gelatin solutions heretofore known.

As is well known, a photographic film may comprise a film base or support made of a cellulose derivative material such as cellulose nitrate or cellulose acetate with a superimposed layer thereon of a light-sensitive gelatino-silver halide emulsion. To prepare the surface of the film support for permanent adhesion of the emulsion coating, it is desirable to coat the film support with a layer of gelatin. The solutions usually employed for this purpose comprise gelatin dissolved in a mixture of water and organic solvents. Such solutions also contain an acid dispersing agent for the gelatin such as acetic acid. Almost all of the acids which have been previously employed as a gelatin dispersant have a serious drawback, that is, they do not provide a colloidal dispersion of gelatin which will remain dispersed in the solution for a long enough period of time. Rather, the dispersed and dissolved gelatin will gradually precipitate leaving a mixture which is not suitable for application to the film base surface.

An object of the present invention is to provide an improved solution containing gelatin which will retain the gelatin in suspension for relatively long periods.

Another object of this invention is to provide a gelatin solution suitable for coating film support which contains a perhalogenated fatty acid as the dispersing agent.

Other objects will appear hereinafter.

In accordance with the present invention these and other objects are attained by employing in the gelatin coating solution a perhalogenated fatty acid as the dispersing and stabilizing agent. Perhalogenated fatty acids such as trifluoroacetic acid, trichloroacetic acid and perfluorocaprylic acid are particularly useful.

This invention is further illustrated in the following examples in which the components are given in percent by weight:

Example 1

A gelatin solution adapted for the subbing of cellulose nitrate, cellulose acetate, cellulose triacetate and similar cellulose ester derivative film supports is prepared by thoroughly mixing the following components in the indicated proportions.

| | Percent |
|---|---|
| Gelatin | 1.25 |
| Trifluoroacetic acid | 0.13 |
| Cellulose nitrate | 0.60 |
| Acetone | 60.00 |
| Ethylene chloride | 5.00 |
| Water | 2.50 |
| Chromic chloride | 0.02 |
| Methanol | 30.50 |

Example 2

A gelatin subbing solution which is adapted for the subbing of the above-mentioned types of film support prepared in accordance with our invention may have the following compositions:

| | Percent |
|---|---|
| Gelatin | 1.25 |
| Perfluorocaprylic acid | 0.10 |
| Cellulose nitrate | 0.60 |
| Acetone | 60.00 |
| Ethylene chloride | 5.00 |
| Water | 2.50 |
| Chromic chloride | 0.02 |
| Methanol | 30.53 |

Example 3

| | Percent |
|---|---|
| Gelatin | 1.25 |
| Trichloroacetic acid | 0.13 |
| Cellulose nitrate | 0.60 |
| Acetone | 60.00 |
| Ethylene chloride | 5.00 |
| Water | 2.50 |
| Chromic chloride | 0.02 |
| Methanol | 30.50 |

Example 4

| | Percent |
|---|---|
| Gelatin | 1.25 |
| Trifluoroacetic acid | .18 |
| Cellulose nitrate | .8 |
| Acetone | 70.0 |
| Water | 2.5 |
| Chromium chloride | 0.025 |
| Methanol (balance) | 25.245 |
| | 100 |

The application of the solutions shown in the above examples may be carried out by any well known coating technique. One such method is to conduct the support through an immersion type hopper containing the solution. Another standard method is by bead application.

Although the above examples show solutions containing definite percentages of the perhalogenated fatty acids, it is to be understood that the proportions of this ingredient may vary widely for different formulas and that the additional solvents employed will be selected upon the basis of the particular type of film support to which the solution is to be applied. We may employ as much as 0.3% or as little as 0.05% of the perhalogenated acid based on weight of the solution and the gelatin will remain in solution for a satisfactory length of time.

The amount of gelatin employed in a given composition may vary depending upon the conditions of application and the specific results desired. In general, we prefer to employ from 0.5% to 1.75% by weight of the composition.

The amount of water present in the gel subbing solutions herein described may vary rather widely. We may employ from 2.5% to 25% of water depending upon the character and amounts of the other components of the composition. The higher concentrations of water are particularly employed when the solutions are applied to a nitrate film support or over a nitrate coating on another type of film support.

Example 5

A solution, in accordance with our invention, which is useful for applying to cellulose nitrate film support is the following:

| | Percent |
|---|---|
| Gelatin | 0.6 |
| Water | 10.0 |
| Acetone | 65.0 |
| Trifluoroacetic acid 5% of weight of gelatin | .03 |
| Methanol (balance) | 24.37 |
| | 100 |

*Example 6*

A solution which is useful for applying to cellulose acetate having a cellulose nitrate coating thereon is the following:

| | Percent |
|---|---|
| Gelatin | 0.6 |
| Water | 20.0 |
| Trifluoroacetic acid 5% of weight of gelatin | 0.03 |
| Methanol | 79.37 |
| | 100 |

Such gelatin solutions prepared in accordance with our invention are adapted for application to an untreated cellulose derivative film support or to one which has been previously subbed with a solution of another cellulose derivative.

We have found that the gelatin solution containing the perhalogenated acids does not disadvantageously affect the photographic characteristics of the emulsion.

We claim:

1. A solution for coating film support containing by weight 0.5 to 1.75% gelatin and approximately .60% by weight of cellulose nitrate in an aqueous solvent mixture of approximately 60% by weight of acetone, approximately 5% by weight of ethylene chloride, approximately .02% by weight of chromic chloride and 25 to 30% by weight of methanol and 0.05% to 0.3% by weight of a perhalogenated fatty acid selected from the group consisting of trifluoroacetic acid, perfluorocaprylic acid, and trichloroacetic acid.

2. A solution for coating film support containing by weight 1.25% gelatin and .60% cellulose nitrate in an aqueous solvent mixture of 60% acetone, 5% ethylene chloride, .02% chromic chloride, 30% methanol and .13% trifluoroacetic acid.

3. A solution for coating film support containing by weight 1.25% gelatin, .60% cellulose nitrate in an aqueous solvent mixture of 60% acetone, 5% ethylene chloride, .02% chromic chloride, 30% methanol and .10% perfluorocaprylic acid.

4. A solution for coating film support containing by weight 1.25% gelatin, .60% cellulose nitrate in an aqueous solvent mixture of 60% acetone, 5% ethylene chloride, .02% chromic chloride, 30% methanol and .13% trichloroacetic acid.

References Cited in the file of this patent

UNITED STATES PATENTS

| 822,107 | Findlay | May 29, 1906 |
|---|---|---|
| 2,313,570 | Nadian et al. | Mar. 9, 1943 |
| 2,454,886 | Sapiro | Nov. 30, 1948 |

OTHER REFERENCES

Sutermeister & Browne's "Casein and Its Industrial Applications," New York, 1939, pages 74–75.